Patented Jan. 11, 1927.

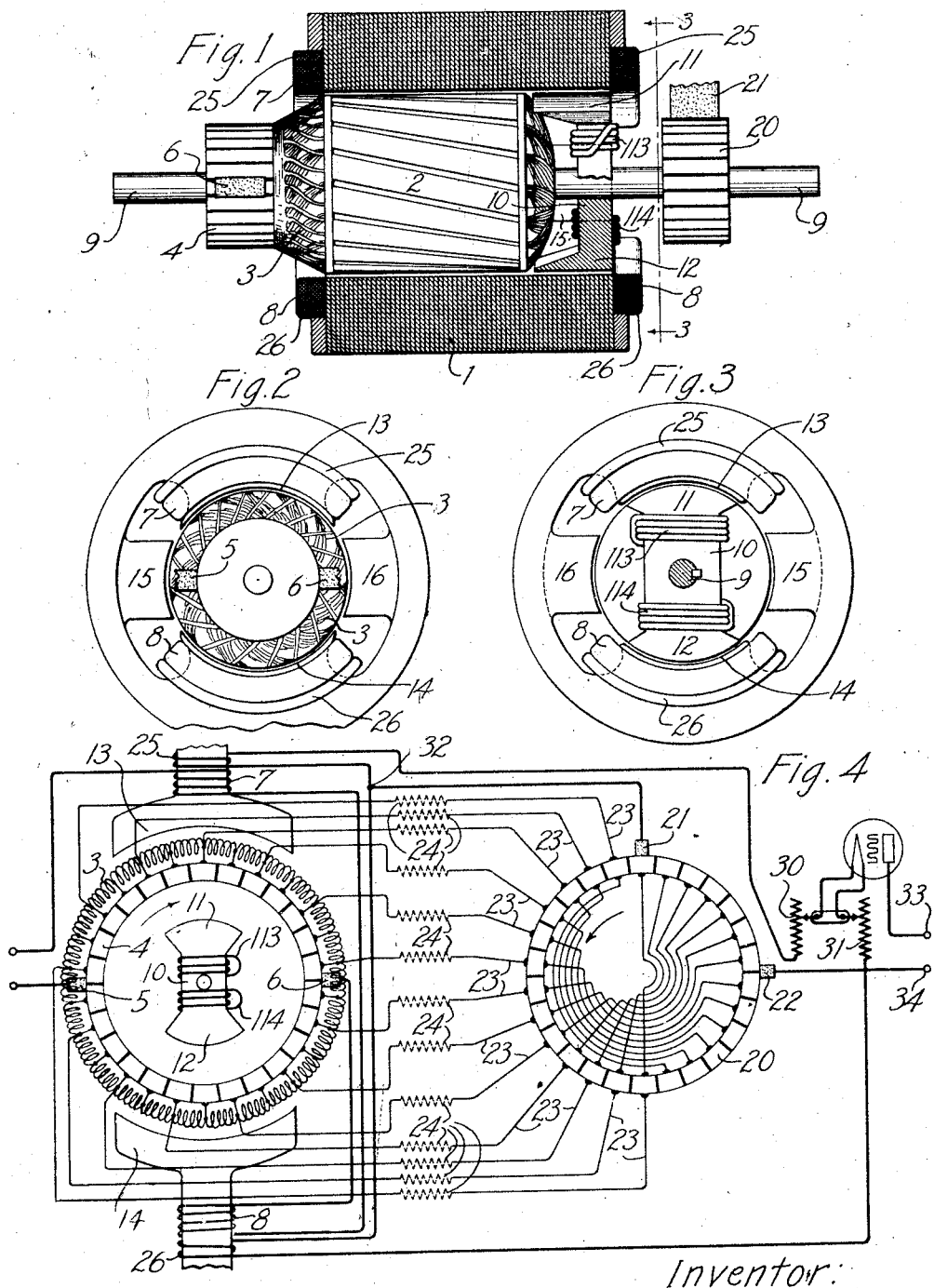

1,613,625

UNITED STATES PATENT OFFICE.

HUGH M. STOLLER, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK.

DYNAMO-ELECTRIC MACHINE.

Application filed December 30, 1922. Serial No. 610,037.

This invention relates to dynamo electric machines and its object in general is to improve the construction and operation of the dynamo electric machines of the synchronous type.

A feature of this invention has to do with the structure whereby there is produced a simple, cheap and commercial form of converter operable from a standard voltage single phase source to deliver a direct current of small value suitable for operating vacuum tube apparatus, electric phonograph reproducers and the like. In accordance with this feature of the invention a single phase series wound commutator motor of standard design and construction is operated at synchronous speed and is provided with a generator commutator. The field poles are provided with secondary windings which form a source of alternating current suitable for energizing the filaments of thermionic tubes.

Referring to the drawing: Fig. 1 is a fragmentary cross-sectional view, partially in elevation, showing the mechanical construction of this invention; Fig. 2 is an elevation looking from the left of Fig. 1; Fig. 3 is a cross-sectional view taken on the line 3—3 of Fig. 1; and Fig. 4 is a schematic diagram showing the connections of the armature winding with the motor and generator commutators, the views of both commutators being taken from opposite ends of Fig. 1 as indicated by the arrows designating the direction of rotation.

The machine comprises bi-polar field structure 1, armature 2, drum winding 3, commutator 4, brushes 5 and 6, and field exciting windings 7 and 8 arranged in the usual manner of a single phase series wound commutator motor. Keyed to shaft 9 there may be a magnetic member 10 comprising a salient poles 11 and 12 arranged to be influenced by field poles 13 and 14. As a comutator motor, armature 2 would in general rotate at an asynchronous speed but salient poles 11 and 12 are synchronously attracted by field poles 13 and 14 thus causing the rotor to pull into synchronism and operate as a synchronous motor. Poles 11 and 12 are provided with closed windings 113 and 114 respectively, of low resistance which tend to keep constant the flux through member 10, as is well understood in the art. This increases the synchronizing force and improves the operation of the machine. Unwound polar projections 15 and 16, placed midway between the main field poles 13 and 14, serve to decrease the reluctance of the magnetic path followed by the flux of member 10, when member 10 is at a large angle to the axis of the main field poles.

As shown schematically in Fig 4, winding 3 and commutator 4 comprise an ordinary drum motor winding and commutator. (Shown as a Gramme ring winding for clearness.) Field poles 13 and 14 are excited by a single phase current and hence the instantaneous flux $\phi_1$ through the field of the machine is given by $$\phi_1 = \Phi \sin \omega t$$

Where $\Phi$ is the maximum field flux and $\omega = 2\pi$ times the frequency of the source. The flux enclosed by a particular armature coil will not be the total field flux but will be a certain proportion of it, depending upon the angle at which the coil is located at any instant. Taking the position at which the coil encloses the maximum flux as an origin, the flux enclosed within the coil at any other position will be the total flux times the cosine of the angle between the origin and the position of the coil. Since the armature is revolving synchronously, this angle will be $\omega t$, and therefore the flux $\varphi_2$ enclosed by an armature coil at any instant is:

$$\phi_2 = \Phi \sin \omega t \cos \omega t.$$

By trigonometry, this may be written:

$$\phi_2 = 1/2 \Phi \sin 2\omega t. \quad (1)$$

The instantaneous voltage induced in such an armature coil is equal to:

$$e = n \frac{d\phi_2}{dt} \quad (2)$$

where $n$ is the number of turns in the coil. Differentiating equation (1) to obtain the value of $$\frac{d\phi_2}{dt}$$

and substituting in equation (2)

$$e = \omega \Phi n \cos 2\omega t.$$

It is seen that the voltage generated in winding 3, as a result of its rotation at a velocity $\omega$, has a frequency equal to twice that of the input voltage and corresponding to an angular velocity of $2\omega$. This double cycle wave may be rectified by connecting the winding to two adjacent segments of a four part commutator which cooperates with brushes so that the relative electrical angular velocity between the commutator and the brushes is equal to $2\omega$ or twice the angular velocity of winding 3 which consequently produces direct current at the output brushes 21 and 22.

In the form of invention illustrated, a generator commutator 20 is mounted upon the same shaft as motor commutator 4 and hence rotates at the same physical speed as the armature winding. In order that the relative electrical speed of rotation between commutator 20 and generator brushes 21 and 22 may be $2\omega$ or twice its physical speed of rotation, the diametrically opposite segments of commutator 20 are cross-connected as shown. The consecutive segments which occupy a semi-circumference of commutator 20 are connected by leads 23 to alternate segments of commutator 4, which has the same total number of segments as commutator 20. It is seen from Fig. 4 that with this arrangement the connecting leads are placed over only a semi-circumference of commutator 20 but are equally spaced over the entire circumference of commutator 4. By placing generator brushes 21 and 22 spaced as shown at an angle which is half of the angular spacing of motor brushes 5 and 6, the electrical angular velocity of cross-connected commutator 20 relative to brushes 21 and 22 is equal to $2\omega$ which is twice the angular velocity of winding 3; and hence direct current may be drawn from brushes 21 and 22.

With this arrangement, brushes 21 and 22 will in general commutate armature coils which are cutting flux and in order to limit the short-circuit current in the coils and reduce sparking at brushes 21 and 22, resistances 24 may be provided in the connections between commutators 20 and 4. This may be accomplished by making the connecting leads of wire of resistance material, such as German silver.

Field poles 13 and 14 are traversed by a sinusoidally varying flux which will induce an alternating E. M. F. in secondary windings 25 and 26. These windings are duplicates of such a number of turns that when connected in series, they form a suitable source of current for energizing the filaments of thermionic tubes. Duplicate variable resistance elements 30 and 31 may be provided so that the filament current can be adjusted without causing the average filament potential to vary from the potential of point 32. The direct current voltage of brushes 21 and 22 is suitable for applying to the plate circuit of a therminoic tube, which may be connected as shown, any plate circuit apparatus used in conjunction with the tube being connected between terminals 33 and 34.

Salient pole member 10 makes possible certain advantageous operating characteristics. For example, it may be a permanent magnet in which case the machine will always pull in synchronism so that the same generator brush is positive. However, it is found that member 10 and unwound polar projections 15 and 16 are not essential and the cost of the machine may be decreased by their omission. If omitted, the machine is pulled into and maintained in synchronism by the interaction of the single phase field flux and the current drawn from the generator armature.

A bi-polar machine has been illustrated but it is apparent that a machine having any suitable number of poles may be constructed in accordance with this invention. In the general case of an $n$ pole machine, leads from the generator commutator segments which occupy a semi-circumference are distributed over the entire armature winding as shown in Fig. 4. However, the cross-connection of the generator commutator is made so that segments which are spaced by an angle of $\frac{2\pi}{n}$ are connected, and the generator brushes are positioned so that the angle between them is equal to $\frac{\pi}{n}$.

What is claimed is:

1. A synchronous converter, comprising an armature winding, electro-magnetic field poles adjacent said winding, a generator commutator connected to said winding, and a motor commutator having a segment connected to each of the segments of said generator commutator by leads having a substantial resistance.

2. A dynamo electric machine comprising an armature, a distributed winding upon said armature, electromagnetic field poles in juxtaposition to said armature; a motor commutator connected to said winding, a generator commutator, and means for connecting consecutive segments of said generator commutator which together occupy substantially half of the periphery of the commutator to points distributed over the entire winding.

3. A dynamo-electric machine, comprising an armature, a distributed winding upon said armature; electromagnetic poles in juxtaposition to said armature; a motor commutator; a generator commutator; and means for connecting consecutive segments of said generator commutator, which together occupy substantially half of the periphery of the generator commutator, to points distributed over the entire winding.

4. A dynamo-electric machine; comprising an armature, a distributed winding upon said armature, $n$ poles in juxtaposition to said armature, a motor commutator; a generator commutator, means for connecting consecutive segments of said generator commutator which together occupy substantially half of the periphery of said generator commutator to points distributed over the entire winding, and a pair of brushes cooperating with said generator commutator, said brushes being spaced at an angle of $\frac{\pi}{n}$.

5. A dynamo-electric machine, comprising an armature, a distributed winding upon said armature, $n$ poles in juxtaposition to said armature, a motor commutator; a generator commutator, means for connecting consecutive segments of said generator commutator which together occupy substantially half of the periphery of the generator commutator to points distributed over the entire winding, and means for electrically connecting generator commutator segments which are spaced on said generator commutator at an angle of substantially $\frac{2\pi}{n}$.

6. A dynamo-electric machine comprising an armature, a distributed winding upon said armature, $n$ poles in juxtaposition to said armature, a motor commutator connected to said winding, a generator commutator, and means for connecting consecutive segments of said generator commutator which together occupy substantially half of the periphery of said commutator to points distributed over the entire winding, and means for electrically connecting generator segments which are spaced at an angle of substantially $\frac{2\pi}{n}$.

In witness whereof, I hereunto subscribe my name this 29th day of December, A. D., 1922.

HUGH M. STOLLER.